(12) United States Patent
Miyazawa (10) Patent No.: US 6,804,591 B1
(45) Date of Patent: Oct. 12, 2004

(54) VEHICLE-MOUNTED INFORMATION DEVICE

(75) Inventor: Hirohisa Miyazawa, Kanagawa (JP)

(73) Assignee: Xanavi Informatics Corporation, Kanagawa (JP)

( * ) Notice: Subject to any disclaimer, the term of this patent is extended or adjusted under 35 U.S.C. 154(b) by 23 days.

(21) Appl. No.: 10/398,401

(22) PCT Filed: Oct. 6, 2000

(86) PCT No.: PCT/JP00/07006

§ 371 (c)(1),
(2), (4) Date: Apr. 7, 2003

(87) PCT Pub. No.: WO02/30713

PCT Pub. Date: Apr. 18, 2002

(51) Int. Cl.[7] .............................................. G06F 19/00
(52) U.S. Cl. ......................... 701/36; 701/200; 307/10.1
(58) Field of Search ............................. 701/1, 36, 200; 340/995.1; 307/10.1

(56) References Cited

U.S. PATENT DOCUMENTS

| | | | | |
|---|---|---|---|---|
| 5,444,664 A | * | 8/1995 | Kuroda et al. ............... 365/226 |
| 5,522,034 A | * | 5/1996 | Watari et al. .................. 714/22 |
| 5,744,874 A | * | 4/1998 | Yoshida et al. ............. 307/10.1 |
| 5,781,780 A | * | 7/1998 | Walsh et al. ................. 713/300 |
| 5,845,132 A | * | 12/1998 | Walsh et al. ................. 710/260 |
| 6,442,702 B1 | * | 8/2002 | Ishikawa et al. ............. 713/340 |
| 6,459,175 B1 | * | 10/2002 | Potega ......................... 307/149 |
| 6,658,576 B1 | * | 12/2003 | Lee .............................. 713/320 |
| 2003/0075980 A1 | * | 4/2003 | Yoshida et al. .............. 307/9.1 |

FOREIGN PATENT DOCUMENTS

| | | |
|---|---|---|
| JP | 05197459 | 8/1993 |
| JP | 10175484 | 6/1998 |
| JP | 2000227997 | 8/2000 |

* cited by examiner

Primary Examiner—Gary Chin
(74) Attorney, Agent, or Firm—Crowell & Moring LLP (57) ABSTRACT

An information device for on-vehicle use, includes: a CPU which is capable of normal operation and of standby operation which achieves low power consumption; a first power supply for use during the normal operation of the CPU; a second power supply for use during the standby operation of the CPU; and a power control device which performs ON-OFF control of the first power supply and the second power supply. And the CPU outputs a first signal to the power control device when the CPU transits from the normal operation to the standby operation; the power control device outputs a second signal to the second power supply which turns the second power supply ON when the first signal has been inputted from the CPU, and outputs a third signal to the first power supply which turns the first power supply OFF after a predetermined time period has elapsed after the output of the second signal; the CPU outputs a fourth signal to the power control device when the CPU transits from the standby operation to the normal operation; and the power control device outputs a fifth signal to the first power supply which turns the first power supply ON when the fourth signal has been inputted from the CPU, and outputs a sixth signal to the second power supply which turns the second power supply OFF after a predetermined time period has elapsed after the output of the fifth signal.

4 Claims, 5 Drawing Sheets

VEHICLE-MOUNTED INFORMATION DEVICE

TECHNICAL FIELD

The present invention relates to an information device for on-vehicle use.

BACKGROUND ART

In the prior art, with an information device for on-vehicle use such as, for example, a car navigation device, when the ignition key of the vehicle is turned OFF (i.e. has been rotated from the ACC position to the OFF position), all the power which is being supplied to the car navigation device has been turned OFF after certain predetermined required information has been saved in non volatile memory or the like. Next, when the ignition key is turned ON (i.e. has been rotated from the OFF position to the ACC position or to the ON position), the power supply to the car navigation device is turned ON, and, after the previous required information has been read out from the non volatile memory and a predetermined setup procedure has been performed based upon this information, the car navigation device is made available for use.

However, since a certain time period is required after the power supply has been turned ON for the reading out from the non volatile memory and for the subsequent setup, it has been necessary to wait for a considerable waiting period until the car navigation device becomes available for use.

DISCLOSURE OF THE INVENTION

The objective of the present invention is to propose an information device for on-vehicle use which includes a more suitable power control device, and which is made so as to be able to be used promptly after the power supply has been turned ON, in its state before the power supply was turned OFF.

In order to attain the above objective, an information device for on-vehicle use, comprises: a CPU which is capable of normal operation and of standby operation which achieves low power consumption; a first power supply for use during the normal operation of the CPU; a second power supply for use during the standby operation of the CPU; and a power control device which performs ON-OFF control of the first power supply and the second power supply. And the CPU outputs a first signal to the power control device when the CPU transits from the normal operation to the standby operation; the power control device outputs a second signal to the second power supply which turns the second power supply ON when the first signal has been inputted from the CPU, and outputs a third signal to the first power supply which turns the first power supply OFF after a predetermined time period has elapsed after the output of the second signal; the CPU outputs a fourth signal to the power control device when the CPU transits from the standby operation to the normal operation; and the power control device outputs a fifth signal to the first power supply which turns the first power supply ON when the fourth signal has been inputted from the CPU, and outputs a sixth signal to the second power supply which turns the second power supply OFF after a predetermined time period has elapsed after the output of the fifth signal.

In this information device for on-vehicle use, it is preferred that: a DRAM which is employed in the normal operation of the CPU and a third power supply which supplies power to the DRAM are further provided; and when the CPU transits from the normal operation to the standby operation, the third power supply continues to supply power to the DRAM.

Also, it is preferred that: there is further provided an ON-OFF detection device which detects a signal for turning the information device for on-vehicle use ON and OFF in association with operation of an ignition key of a vehicle; when the ON-OFF detection device has detected a signal to turn the information device for on-vehicle use OFF, the ON-OFF detection device notifies the CPU to an effect that the ON-OFF detection device has detected the signal to turn the information device for on-vehicle use OFF; and the CPU transits to the standby operation after having executed a predetermined procedure for standby. In this case, it is preferred that: when the ON-OFF detection device has detected a signal to turn the information device for on-vehicle use OFF directly before rotation of a starter motor of the vehicle, the ON-OFF detection device notifies the CPU to an effect that the ON-OFF detection device has detected the signal to turn the information device for on-vehicle use OFF directly before rotation of the starter motor of the vehicle; and the CPU transits to the standby operation after only a portion of the procedure for standby has been executed, so that the procedure for standby is completed before starting of rotation of the starter motor of the vehicle.

BEST MODE FOR CARRYING OUT THE INVENTION

Figure 1:
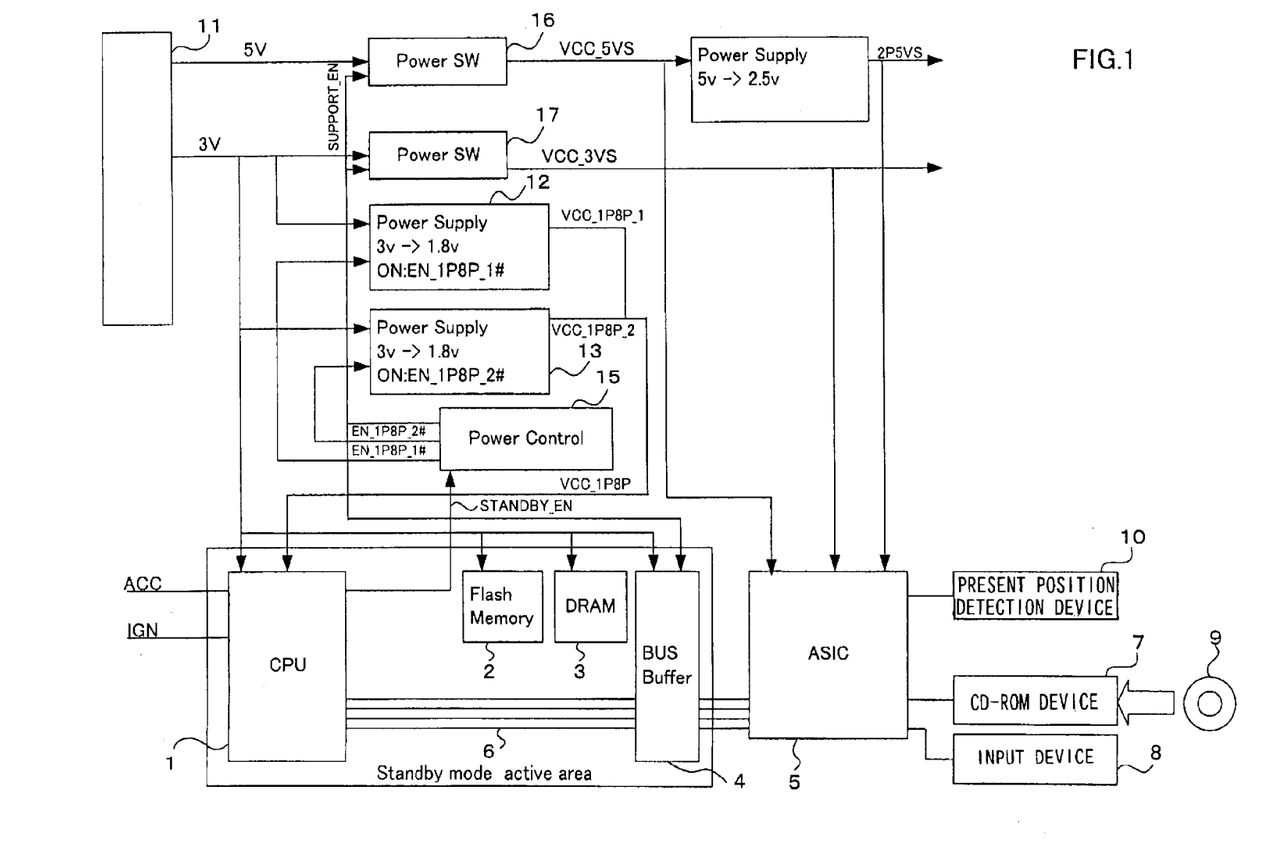
FIG. 1 is a block diagram of a car navigation device according to an embodiment of the present invention.

FIG. 1 is a block diagram of a car navigation device according to an embodiment of the present invention. The reference symbol 1 is a CPU which performs control of the car navigation device as a whole; the reference symbol 2 is a flash memory which is a non volatile memory; the reference symbol 3 is a DRAM which is a volatile memory; the reference symbol 4 is a bus buffer, the reference symbol 5 is an ASIC, and the reference symbol 6 is a bus.

The ASIC 5 is made from gate arrays and comprises specialized logic elements. A present position detection device 10, a CD-ROM device 7, and an input device 8 are connected to the ASIC 5. The present position detection device 10 is endowed with the function of detecting the present ground position of the vehicle (the position of this vehicle), and may comprise, for example, an azimuth sensor (not shown in the figures) which detects the azimuth of the movement of the vehicle, a vehicle speed sensor (not shown in the figure) which detects the speed of the vehicle, and a GPS sensor (a GPS receiver) (not shown in the figures)

which detects GPS signals from GPS (Global Positioning System) satellites.

A CD-ROM 9 upon which road map data is recorded is loaded into the CD-ROM device 7, and the CD-ROM device 7 and the CD-ROM 9 constitute a map database device which is used for navigation. It should be understood that, if a CD-ROM for music or a program storage CD-ROM or the like is loaded, it operates as a CD-ROM reading device. The input device 8 consists of a keyboard or a joystick for input of a target location for the vehicle and the like, or of various other switches.

A control program for the car navigation device is stored in the flash memory 2, and further necessary information is stored as appropriate. The DRAM 3 operates as a work area or data area for the CPU 1 to execute its control program, and, for example, route search conditions or calculation results of route searching, or map data which has been readout from the CD-ROM 9 or the like, are stored therein. Furthermore, the DRAM 3 also includes video RAM for a display device (not shown in the figures) which stores image data for display. In other words, the DRAM 3 stores data which has been stored in the CD-ROM 9 or in the flash memory 2 and has been read out, and stores calculation results which have been generated for use by subsequent further processing. The DRAM 3 may, for example, employ S-DRAM (synchronous DRAM), and is capable of processing at high speed.

With a car navigation device constituted in this manner, various types of navigation are performed based upon the position information for this vehicle which has been detected by the present position detection device 10 described above and upon the road map data which is stored in the CD-ROM 9. For example, the road map in the vicinity of the present position of this vehicle and the position of this vehicle may be displayed upon the display device (not shown in the figures), and the driver may be guided along a route (path) which has been obtained by route searching.

Next, the power supply control (power control) of the car navigation device of this embodiment will be explained.

Before explaining the power supply control for the car navigation device, first, the electrical equipment system of the vehicle to which the car navigation device is fitted will be explained. The electrical equipment system of the vehicle is controlled by the ignition key switch being turned ON and OFF. Normally the key cylinder into which the ignition key is inserted has a LOCK position, an OFF position, an ACC position, an ON position, and a START position. When the ignition key is in the LOCK position or the OFF position, the electrical equipment system such as the accessories and the like is not ON; while in the ACC position, in other words in the accessory ON position, the power supply to the accessories such as the car radio and the like is ON. Next, when the ignition key is rotated via the ON position to the START position, the starter motor is rotated and the engine is started. After this, the rotation of the engine (its ignition) is maintained in the ON position. When from this state the ignition key is rotated to the ACC position, although the engine stops, the power supply to the accessories is maintained as ON. Next, when the key is rotated to the OFF position, the power supply to the accessories goes OFF; and, when it is rotated to the LOCK position, it is possible to remove the ignition key from the key cylinder with the steering in the locked state.

A signal ACC and a signal IGN as shown in FIG. 1 are inputted to the car navigation device in association with the operation of the ignition key switch as described above. The signal ACC is ON when the ignition key is in the ACC position and in the ON position, and is OFF in the other positions thereof. The signal IGN is ON when the ignition key is in the ON position and in the START position, and is OFF in the other positions thereof. The ON and OFF of the supply of power to the car navigation device is controlled by these signals ACC and IGN.

The car navigation device of this embodiment has, as power supply modes, a power supply ON mode and a standby mode. The power supply ON mode is a mode in which the supply of power is turned on to all the structural elements of the car navigation device, and the processing for normal car navigation is performed. And the standby mode is a mode in which the CPU 1, the flash memory 2, the DRAM 3, and the bus buffer 4 are backed up by a predetermined power supply, while the supply of power to all the other structural elements is OFF. In other words, the standby mode is a mode in which source power is supplied in a low power consumption mode to only the minimum required level of components. The reason that the standby mode is provided is in order to make it possible to use the car navigation device promptly when next the device changes over to the power supply ON mode, by maintaining the contents of the memory even when the device enters the standby mode. An explanation of transiting to the power supply ON mode and the standby mode by operation of the ignition key will be provided later.

The car navigation device of this embodiment, overall, uses direct current power supplies of 5 VDC, 3 VDC, 1.8 VDC, and 2.5 VDC. The reference symbol 11 is a power supply which generates 5 VDC and 3 VDC from the 12 VDC of the car battery. The power supply 11 always supplies 5 VDC and 3 VDC. It should be understood that the power supply 11 may not be a dedicated power supply for the car navigation device, but may be a power supply which is used in common by the entire vehicle.

The reference symbol 12 and the reference symbol 13 are power supplies which generate 1.8 VDC from the 3 VDC of the power supply 11. The power supply 12 is a power supply circuit of high capacity which supplies power to the CPU 1 during the normal power supply ON mode. And the power supply 13 is a power supply circuit of low capacity which supplies power to the CPU 1 during the standby mode. The reference symbol 14 is a power supply circuit which generates 2.5 VDC from the 5 VDC of the power supply 11.

The reference symbol 15 is a power control circuit which is made up from logic circuits. This power control circuit 15 receives a signal (STNDBY_EN) from the CPU 1, and controls the ON-OFF of the power supplies 12 and 13 and the power switches 16 and 17. The power switch 16 receives a signal (SUPPORT_EN) from the power control circuit 15, and controls the ON-OFF of the 5 VDC from the power supply 11. And the power switch 17 receives the signal (SUPPORT_EN) from the power control circuit 15, and controls the ON-OFF of the 3 VDC from the power supply 11. The power switches 16 and 17 are made up from mechanical relays or from semiconductor switches.

Next the power supplies which are required by the various elements will be explained. The CPU 1 of this embodiment requires 3 VDC and 1.8 VDC. The flash memory 2, the DRAM 3, and the bus buffer 4 require 3 VDC. The ASIC 5 requires 5 VDC, 3 VDC, and 2.5 VDC. And the present position detection device 10, the CD-ROM device 7, and the input device 8 require 3 VDC and 5 VDC as necessary.

The CPU 1 of this embodiment is itself endowed with a normal mode (normal operation) and a standby mode (standby operation). The standby mode of the CPU 1 itself will hereinafter be termed the CPU standby mode, in order to differentiate it from the previously described standby mode of the car navigation device. Furthermore, its normal mode will also hereinafter be termed the CPU normal mode. The CPU normal mode is a mode in which the CPU 1 executes a program normally. And the CPU standby mode is a mode in which the CPU 1 itself waits in a low power consumption mode and does not execute any program.

When the CPU 1 enters the CPU standby mode the CPU 1 makes the signal STANDBY_EN ON, and when it returns to the CPU normal mode it makes the signal STANDBY_EN OFF. When the CPU 1 enters the CPU standby mode, its power consumption at 3 VDC and at 1.8 VDC becomes extremely small. For example, in the case of 1.8 VDC, while in the CPU normal mode the consumption of electrical current may be about 800 mA, when the CPU standby mode is entered, it may become about 100 $\mu$A. Accordingly, in the standby mode, the low capacity power supply 13 whose power loss is small is used as the power supply for the 1.8 VDC of the CPU 1.

When the CPU 1 executes a predetermined command for the CPU standby mode, it enters the CPU standby mode itself. When, in the standby mode, it receives a signal from the outside, it wakes up and returns to the CPU normal mode. In this embodiment, when during the CPU standby mode the signal ACC to the CPU 1 goes to ON, the CPU 1 transits from the CPU standby mode to the CPU normal mode. However, a different signal may be employed as the cause for wakeup.

Figure 2:
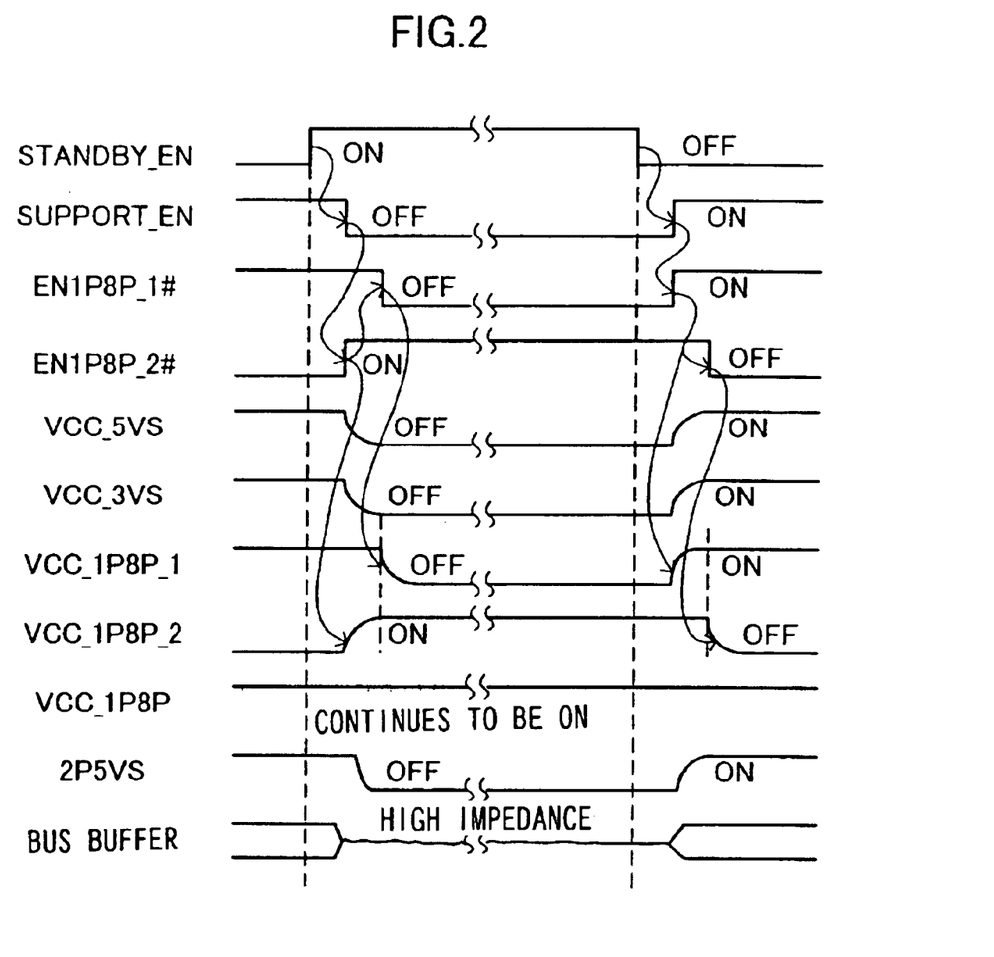
FIG. 2 is a timing chart of the operation of a power supply etc. when a CPU transits into standby mode, and when the CPU transits into normal mode.

FIG. 2 is a timing chart which shows the manner in which each of the power supplies is controlled when the CPU 1 transits to the CPU standby mode, and also when it transits to the CPU normal mode upon being woken up. It should be understood that the explanation of how the CPU 1 transits to the CPU standby mode due to the signal ACC, and how it is woken up and transits to the CPU normal mode, will be provided later.

In the following explanation, the 5 VDC which is outputted from the power switch 16 will be termed VCC 5VS, the 3 VDC which is outputted from the power switch 17 will be termed VCC _3VS, the 1.8 VDC which is outputted from the power supply 12 will be termed VCC_1P8P_1, the 1.8 VDC which is outputted from the power supply 13 will be termed VCC_1P8P_2, the wired OR power supply of VCC_1P8P_1 and VCC_1P8P_2 will be termed VCC_1PBP, and the 2.5 VDC which is outputted from the power supply 14 will be termed 2P5VS. Furthermore, the signal which is outputted from the power control circuit 15 and which controls the power supply 12 will be termed EN1P8P_1#, the signal which controls the power supply 13 will be termed EN1P8P_2#, and the signal which controls the power switch 16, the power switch 17, and the bus buffer 4 will be termed SUPPORT_EN.

It should be understood that, in the following explanation, when a signal or a power supply has become active it is spoken of as having gone "ON", and when a low active signal has become active it also is spoken of as having gone "ON". Accordingly, in FIG. 2, when a low active signal as well is ON, they are all shown as high.

When the CPU 1 goes into the standby mode, the signal STANDBY_EN goes ON just before. When the signal STANDBY_EN goes ON, the power control circuit 15 turns the signal SUPPORT_EN to OFF. The signal SUPPORT_EN is set to ON during the CPU normal mode while the signal STANDBY_EN is being received, while during the CPU standby mode it is set to OFF. The power control circuit 15 turns the signal EN1P8P_2# to ON at almost the same timing as when the signal SUPPORT_EN goes to OFF, and turns the signal EN1P8P_1# to OFF after the voltage of the power supply VCC_1P8P_2 has stabilized.

The ON-OFF of the power supply 12 is controlled by the ON-OFF of the signal EN1P8P_1#, and the ON-OFF of the power supply 13 is controlled by the ON-OFF of the signal EN1P8P_2#. Accordingly, when the CPU standby mode is entered, without fail, after first the power supply 13 has been turned ON by the signal EN1P8P_2 going ON, then the signal EN1P8P_1# goes OFF and the power supply 12 is turned OFF. By doing this, no noise is imposed upon the power supply VCC_1P8P due to the switching over. The time period after the signal EN1P8P_2# goes ON until the signal EN1P8P_1# goes OFF can be varied to any suitable value within the range in which no noise is imposed upon the power supply VCC_1P8P due to the switching over.

The power switch 16 and the power switch 17 receive the signal SUPPORT_EN and output the power supply VCC_5VS and the power supply VCC_3VS, but, since these power supplies are not used for any structural elements which must be supplied during the standby mode, no particular problem will occur whether they are ON or OFF. The bus buffer 4 functions as a bus buffer for the exterior when the signal SUPPORT_EN is ON, and when the signal SUPPORT_EN goes to OFF it becomes high impedance and functions to cut off connection to the external circuitry. Due to this, signals or flows of current from the outside are cut off while the signal SUPPORT_EN is OFF, in other words during the standby mode.

As above, when, after the CPU 1 has executed the predetermined procedure for entering the standby mode, the CPU 1 itself enters the CPU standby mode, then the power supply VCC_1P8P to the CPU 1 changes over appropriately from the power supply VCC_1P8P_1 to the power supply VCC_1P8P_2. Furthermore, the 3 VDC to the CPU 1, the flash memory 2, the DRAM 3, and the bus buffer 4 continues to be supplied just as it is, while, apart from these, the supplies of power to the ASIC 5, the present position detection device 10, the CD-ROM device 7, the input device 8, and the other structural elements for which power supply is not required during the standby mode are all cut off by the power switch 16 and the power switch 17. By doing this, the transition of the car navigation device to the standby mode is completed.

Next, the case in which the CPU 1 returns from the CPU standby mode to the CPU normal mode will be explained. When the CPU 1 is to return to the CPU normal mode, the signal STANDBY_EN goes to OFF. When the signal STANDBY_EN goes to OFF, the power control circuit 15 turns the signal SUPPORT_EN to ON. The power control circuit 15 turns the signal 1P8P_1# to ON at almost the same timing as when the signal SUPPORT_EN goes to ON, and after the voltage of the power supply VCC_1P8P_1 has stabilized, it turns the signal EN1P8P_2# to OFF.

By doing the above, when the CPU 1 has returned to the CPU normal mode, without fail, after the signal EN1P8P_1# has gone to ON and the power supply 12 has first been turned ON, then the signal EN1P8P_2# is turned to OFF and the power supply 13 is turned to OFF. Accordingly, no noise is imposed upon the power supply VCC_1P8P due to the changeover. The time period after the signal EN1P8P_1# goes ON until the signal EN1P8P_2# goes OFF can be varied to any suitable value within the range in which no noise is imposed upon the power supply VCC_1P8P due to the switching over.

As above, when the CPU 1 enters the CPU normal mode from the CPU standby mode, the power supply VCC_1P8P to the CPU 1 is appropriately changed over from the power supply VCC_1P8P_2 to the power supply VCC_1P8P_1. Furthermore, the 3 VDC to the CPU 1, the flash memory 2, the DRAM 3, and the bus buffer 4 continues to be supplied just as it is, while, apart from these, the supplies of power to the ASIC 5, the present position detection device 10, the CD-ROM device 7, the input device 8, and the other structural elements for which power supply was not required during the standby mode are all turned ON by the power switch 16 and the power switch 17. After this, the CPU 1 executes certain predetermined processing in order to complete the transition of the car navigation device to the power supply ON mode.

It should be understood that, as a variant of the above example, it might also be contemplated to use the OFF-ON of the power supply VCC_5VS or of the power supply VCC_3VS as a signal for turning the power supply 13 ON and OFF. However, when the power supply VCC_5VS or the power supply VCC_3VS is used for control of the ON and OFF of the power supply 13, it becomes difficult to adjust the timing with respect to the OFF and ON of the power supply 12, and there is a possibility that noise will occure due to the change over. Accordingly, in order accurately to control the timing of the ON and OFF of the power supplies 12 and 13, both of these power supplies are controlled by signals from the power control circuit 15.

In other words, with this embodiment, since the ON-OFF of the power supply 12 which is used during the normal mode of the CPU 1 and the ON-OFF of the power supply 13 which is used during its standby mode are performed separately by two different signals which are generated by the power control circuit 15, therefore it is possible to control the ON-OFF of the power supplies 12, 13 positively and moreover accurately. Accordingly, it is also possible reliably to ensure that no changeover noise is generated in the power supply VCC_1P8P.

Figure 3:
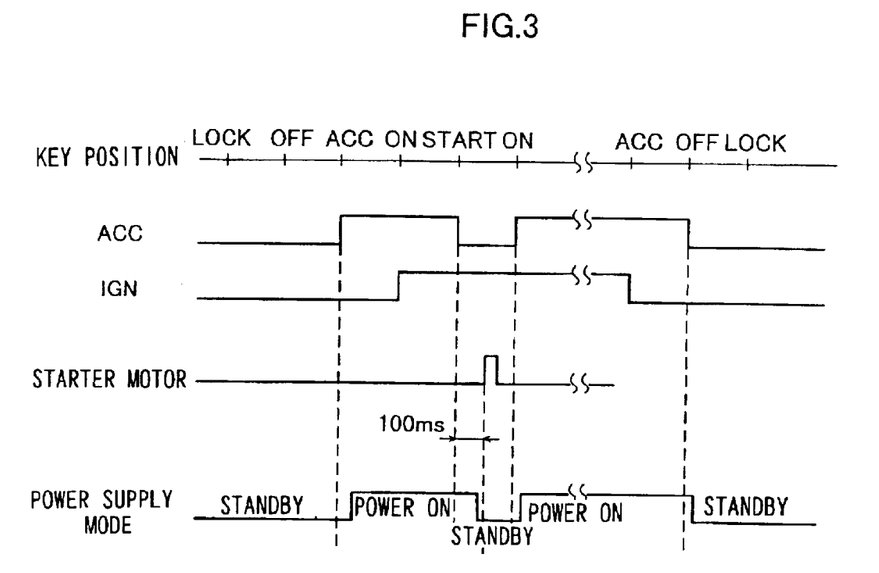
FIG. 3 is a figure showing the relationships between the position of an ignition key and a signal ACC, a signal IGN, etc.

Next, the basic operations when the car navigation device transits to the power supply ON mode and to the standby mode due to operation of the ignition key of the vehicle will be explained. FIG. 3 is a figure showing the relationships between the position of the ignition key and the signal ACC, the signal IGN, etc. which are inputted to the CPU 1.

When the ignition key is in the LOCK position or in the OFF position, the signal ACC and the signal IGN are both OFF. When the ignition key is turned as far as the ACC position, then the signal ACC goes to ON. When the ignition key is turned as far as the ON position, then the signal IGN goes to ON and the signal ACC continues to be ON. When the ignition key is turned as far as the START position, then the signal ACC goes to OFF and the signal IGN continues to be ON. Although the START position is a position in which the starter motor is rotated, the signal ACC is turned OFF when the starter motor is rotated. When the ignition key is returned to the ON position after rotation of the starter motor in the START position, the signal ACC goes to ON again, and the signal IGN continues to be ON. Next, when the engine is to be stopped and the ignition key is turned from the ON position as far as the ACC position, although the signal IGN goes to OFF, the signal ACC still maintains its state of being ON. Next, when the ignition key is turned as far as the OFF position, the signal ACC also goes to OFF.

Here, the operation during cranking of the vehicle will be explained with reference to FIG. 3. When the starter motor is rotated with the ignition key in the START position, a high electrical current flows in order to drive the starter motor. Due to this, the phenomenon appears that the electrical potential of the battery drops considerably during rotation of the starter motor. In this case, since the electrical potential of the supply of power to the car navigation device also drops, this may become a cause of erroneous operation of the car navigation device. Accordingly, during cranking, it is necessary for the car navigation device appropriately to transit to the standby mode.

However, although this also depends upon the speed of the rotational operation of the ignition key, a time period clearance of only about 100 mS is available from when the signal ACC goes to OFF due to the rotation of the ignition key to the START position, to when the starter motor actually starts to rotate. Accordingly, as will be described hereinafter, it is ensured that a shorter time period is sufficient for the procedure of transiting to the standby mode during cranking, than for the procedure of transiting to the normal standby mode.

By the above, the car navigation device transits from the standby mode to the power supply ON mode by the signal ACC going to ON when starting to use the vehicle, temporarily transits to the standby mode due to the signal ACC going to OFF with the ignition key in the START position, and again transits to the power supply ON mode by the signal ACC going to ON after the rotation of the starter motor has been completed. Next, when the use of the vehicle is completed, the car navigation device transits to the standby mode by the signal ACC going to OFF.

It should be understood that, since the signal ACC and the signal IGN are inputted to the CPU 1, the CPU 1 functions as an ON-OFF detection device which detects a signal for turning the car navigation device ON and OFF (for changing over its power supply mode) in association with operation of the ignition key of the vehicle. However, it would also be acceptable to detect this signal by a circuit which was separate from the CPU 1, and to input a signal carrying the result of this detection to the CPU 1.

Figure 4:
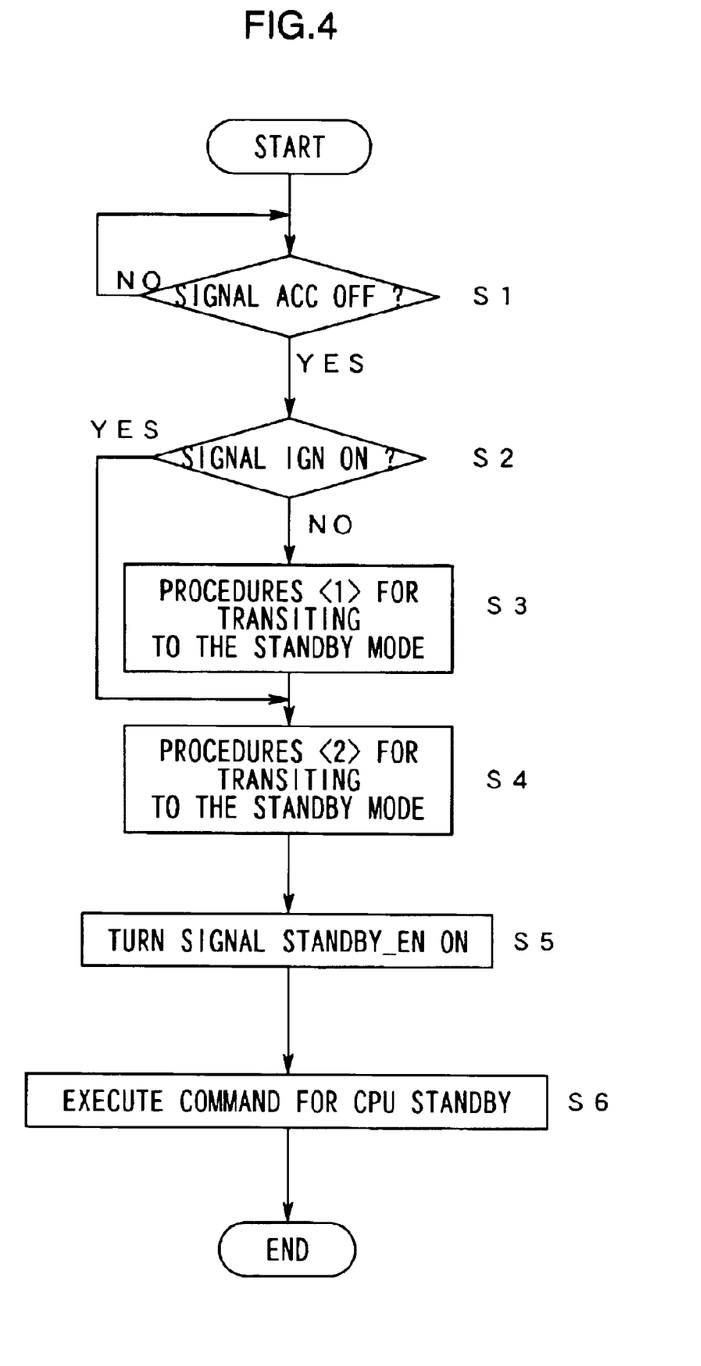
FIG. 4 is a figure showing a flow chart of the control when the standby mode is entered due to the signal ACC and the signal IGN.

FIG. 4 is a flow chart of the control when the standby mode is entered due to the signal ACC and the signal IGN. The procedure of FIG. 4 is executed by the CPU 1.

In a step S1, a decision is made as to whether or not the signal ACC is OFF. If the signal ACC is OFF then the flow of control proceeds to a step S2, while if it is not OFF then this procedure repeats. In the step S2, a decision is made as to whether or not the signal IGN is ON. If the signal IGN is ON then the flow of control proceeds to a step S4, while if it is not ON then the flow of control proceeds to a step S3. If the signal IGN is OFF when the signal ACC is also OFF, then the system transits to the normal standby mode. On the other hand, if the signal IGN is ON when the signal ACC is OFF, the system transits to the above described standby mode for during cranking.

In the steps S3 and S4, the procedure is performed for transiting to the standby mode. In the standby mode in this embodiment, as described above, the power supply of the DRAM 3 is backed up, and the contents of the DRAM 3 are preserved. Accordingly, it is not necessary to transfer the contents of the DRAM 3 to the flash memory 2 which is the non volatile memory. However, when transiting to the standby mode, error checking procedures for the DRAM 3 such as check-summing and the like are performed, as well as the storage of the minimum possible amount of required information and the like.

As described above, although in the transit to the normal standby mode the steps S3 and S4 are processed, in the transit to the standby mode during cranking only the step S4 is performed, since there is not much time available until the power supply drops. Accordingly, procedures are performed in the step S3 such as, for example, error checking and the like, which occupy comparatively great amounts of processing time, and in the case of which no great problem will occur even if, in the worst case, processing is not performed. In the step S4, the necessary procedures are performed which absolutely must be executed for transiting to the standby mode: for example, saving of information such as stack pointers and the like, saving of status of interrupt processing, and so on.

In a step S5, the signal STANDBY_EN is turned ON. After this, in a step S6 a command for the CPU standby mode is executed, and the CPU 1 itself enters the CPU standby mode. The power control circuit 15 executes the above described power control sequence due to the signal STANDBY_EN going to ON, and the car navigation device is put into the standby mode.

Figure 5:
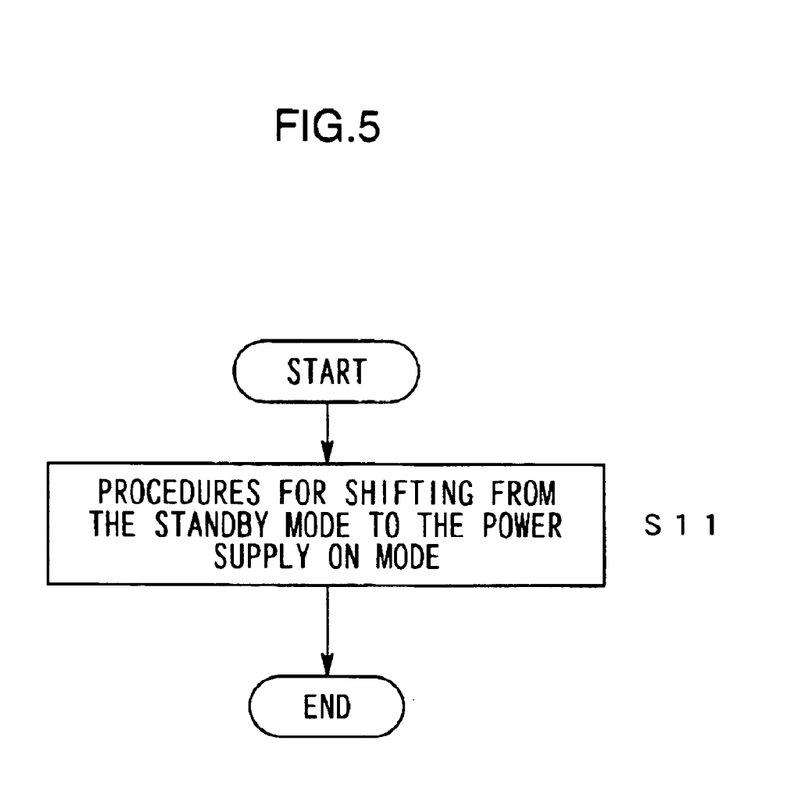
FIG. 5 is a figure showing a flow chart of a transit procedure from the standby mode to the power supply ON mode.

FIG. 5 is a figure showing a flow chart for the processing for transiting from the standby mode to the power supply ON mode. The CPU 1 has a hardware structure such that, when during the CPU standby mode a signal at a predetermined terminal thereof goes to ON, it is capable of being waked up and executing a predetermined program. In this embodiment, the signal ACC is connected to the predetermined terminal, and the predetermined program is the program of FIG. 5. Accordingly when the signal ACC goes to ON due to the operation of the ignition key during the standby mode of the car navigation device, in other words during the CPU standby mode of the CPU 1, the program of FIG. 5 starts to operate.

In a step S11 of FIG. 5, the procedures for transiting from the standby mode to the power supply ON mode are performed. For example, checking is performed as to whether or not the stack pointers and the status of interrupt processing agree with the values which were saved during the transition to the standby mode, and error checking is performed in the DRAM 3 and the flash memory 2, and the like. When the processing of the step S11 has been completed, this routine terminates, and the car navigation device enters the normal power supply ON mode.

Since in this manner the contents of the DRAM 3 are ensured to be the same as the contents before the transition to the standby mode, it is not necessary to transfer any data from the flash memory 2 or to regenerate any data. Accordingly, upon the signal ACC going to ON, the car navigation device promptly becomes able to be used in its state before the transition to the standby mode It should be noted that although, in the above described embodiment, the example of a car navigation device was explained, it is not necessarily limited by this detail. It could be applied to a computer for on-vehicle use (a mobile computer), or to any other intelligent terminal for on-vehicle use. In other words, it can be applied to any information device for on-vehicle use which is equipped with a volatile memory such as a DRAM or the like.

Furthermore, the program of FIGS. 4 and 5 of the above described embodiment may be supplied as recorded upon a recording medium such as a CD-ROM or the like. Furthermore, it would be possible to endow the information device such as a car navigation device or the like with the function of being connected to a portable telephone (a mobile telephone) and of thus being connected to the internet, so that it could receive supply of the program of FIGS. 4 and 5 via the internet.

What is claimed is:

1. An information device for on-vehicle use, comprising:
   a CPU which is capable of normal operation and of standby operation which achieves low power consumption;
   a first power supply for use during the normal operation of the CPU;
   a second power supply for use during the standby operation of the CPU; and
   a power control device which performs ON-OFF control of the first power supply and the second power supply, and wherein:
   the CPU outputs a first signal to the power control device when the CPU transits from the normal operation to the standby operation;
   the power control device outputs a second signal to the second power supply which turns the second power supply ON when the first signal has been inputted from the CPU, and outputs a third signal to the first power supply which turns the first power supply OFF after a predetermined time period has elapsed after the output of the second signal;
   the CPU outputs a fourth signal to the power control device when the CPU transits from the standby operation to the normal operation; and
   the power control device outputs a fifth signal to the first power supply which turns the first power supply ON when the fourth signal has been inputted from the CPU, and outputs a sixth signal to the second power supply which turns the second power supply OFF after a predetermined time period has elapsed after the output of the fifth signal.

2. An information device for on-vehicle use according to claim 1, further comprising:
   a DRAM which is employed in the normal operation of the CPU; and
   a third power supply which supplies power to the DRAM, wherein,
   when the CPU transits from the normal operation to the standby operation, the third power supply continues to supply power to the DRAM.

3. An information device for on-vehicle use according to claim 1, further comprising:
   an ON-OFF detection device which detects a signal for turning the information device for on-vehicle use ON and OFF in association with operation of an ignition key of a vehicle, and wherein:
   when the ON-OFF detection device has detected a signal to turn the information device for on-vehicle use OFF, the ON-OFF detection device notifies the CPU to an effect that the ON-OFF detection device has detected the signal to turn the information device for on-vehicle use OFF; and
   the CPU transits to the standby operation after having executed a predetermined procedure for standby.

4. An information device for on-vehicle use according to claim 3, wherein:
   when the ON-OFF detection device has detected a signal to turn the information device for on-vehicle use OFF directly before rotation of a starter motor of the vehicle, the ON-OFF detection device notifies the CPU to an effect that the ON-OFF detection device has detected the signal to turn the information device for on-vehicle use OFF directly before rotation of the starter motor of the vehicle; and
   the CPU transits to the standby operation after only a portion of the procedure for standby has been executed, so that the procedure for standby is completed before starting of rotation of the starter motor of the vehicle.

* * * * *